United States Patent

[11] 3,567,971

[72] Inventor William W. Goldsworthy
Orinda, Calif.
[21] Appl. No. 763,258
[22] Filed Sept. 27, 1968
[45] Patented Mar. 2, 1971
[73] Assignee the United States of America as represented by the United States Atomic Energy Commission

[54] TIME-SAMPLING-PULSE AMPLIFIER
7 Claims, 1 Drawing Fig.

[52] U.S. Cl. ........................................ 307/267, 307/253, 328/151
[51] Int. Cl. ........................................ H03k 1/18
[50] Field of Search ........................................ 328/58, 151; 307/265—267, 268

[56] References Cited
UNITED STATES PATENTS

| | | | |
|---|---|---|---|
| 2,922,879 | 1/1960 | Vogt et al. | 328/58 |
| 3,448,296 | 6/1969 | Schwaninger | 328/58X |
| 3,470,482 | 9/1969 | Kolnowski | 328/58X |

*Primary Examiner*—John Kominski
*Assistant Examiner*—James B. Mullins
*Attorney*—Roland A. Anderson

ABSTRACT: A pulse amplifier particularly designed for amplifying electrical pulses from charged particle detectors and normally having differentiation networks with a short time constant so that base line stability and immunity from low frequency "noise" is obtained. When an input pulse is detected, the time constant of the networks is increased for the duration of the pulse by increasing the resistance in the networks. The longer time constant provides accurate energy resolution by minimizing signal loss during a pulse. After the pulse amplitude has been sampled, the short time constant is restored and the baseline potential is rapidly obtained.

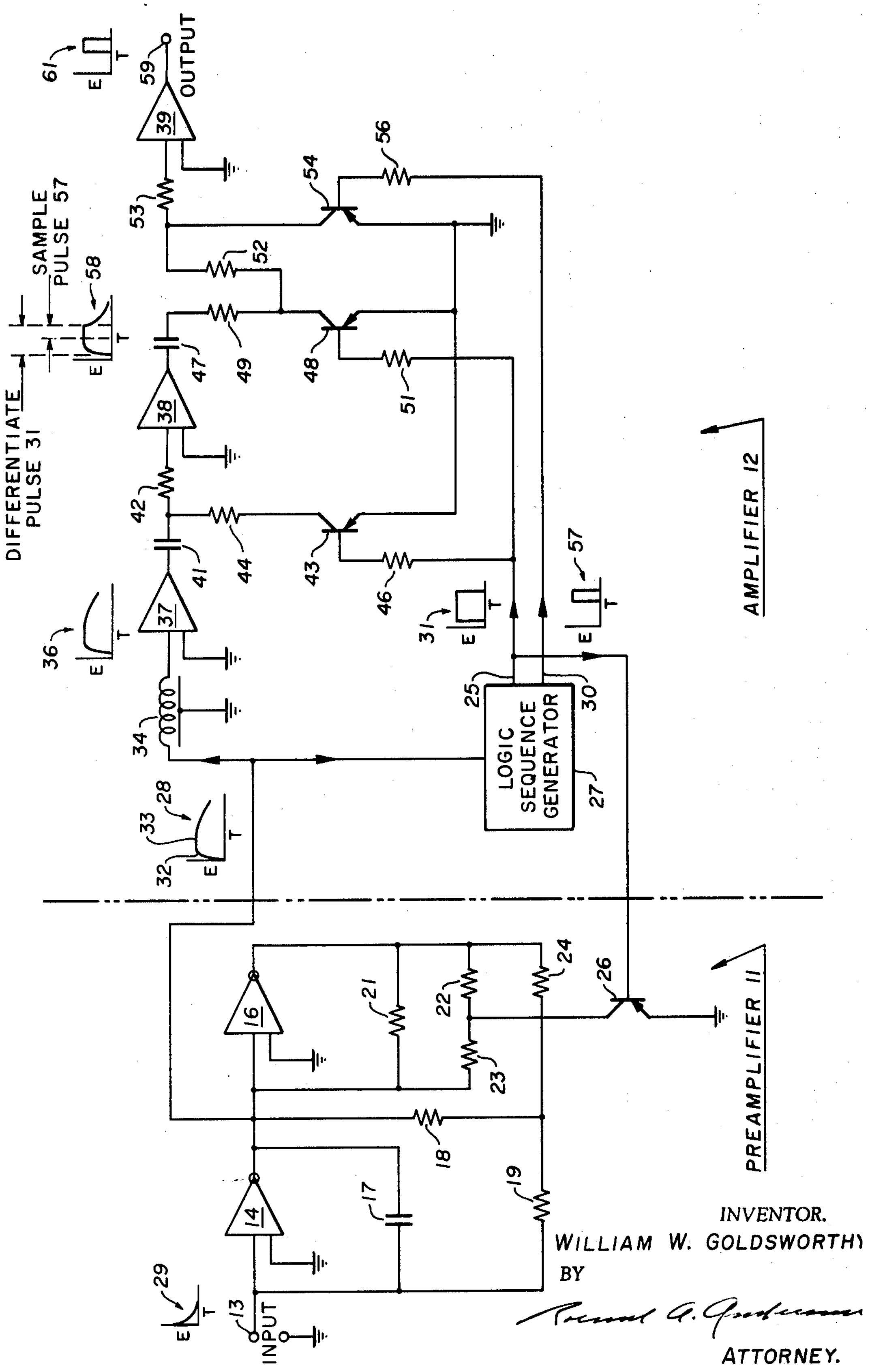
INVENTOR.
WILLIAM W. GOLDSWORTHY
BY
ATTORNEY.

TIME-SAMPLING-PULSE AMPLIFIER

BACKGROUND OF THE INVENTION

This invention relates generally to electronic pulse amplifiers and more particularly to an improved amplifier for charged particle induced pulses. The invention described herein was made in the course of, or under, Contract W-7405-eng-48 with the Atomic Energy Commission.

Satisfactory amplification of pulses induced by charged particles or rays is a recurrent problem in the atomic energy field. Usually, it is necessary to preserve the amplitude of the pulses so that a determination of the relative energies of particles or rays may be obtained.

Since interference and amplifier noise exist, some decision originally has to be made regarding the time to be expended in measuring each nuclear event, such events being randomly spaced in time. Usually, a time period is preselected which, for most nuclear spectroscopy systems, turns out to be about 1 microsecond, where there is a reasonable comprise between event-produced statistics and system noise. It also follows that the most accurate measurement decision should be attained while maintaining high information density.

In conventional amplifier systems the basic time taken per event is largely determined by the differentiation time chosen; and the information is averaged during this time period by integration. Both high and low frequency noise present at the detector, in the amplifier input, and in early amplifier stages, are thus highly attenuated by the band-pass action of the filter so formed by integration and differentiation, while frequency components comprising the signal of interest suffer only minimal attenuation because of their frequency predominance alignment with the filter. This usual process of integration an differentiation, however, leaves much to be desired with respect to good information density and good time definition.

SUMMARY OF THE INVENTION

The present invention is an amplifier circuit in which the above-described problems have been met by actively changing the value of time constant during the time a pulse is being received. In the "normal" state of the amplifier, that is, between input pulses, a short time constant is provided so that the base line level is very rapidly restored and maintained after cessation of an input pulse. Thus the amplitude of a closely following pulse is taken with reference to the base line rather than the "tail" of the preceding pulse, the latter being more likely to occur when a long time constant circuit is used. Also, the short time constant circuit provides immunity to low frequency noise such as power source voltage variations, microphonics, etc. However, when an input pulse is received, a long time constant is provided by increasing the resistance in the resistance-capacitance coupling networks in the amplifier. Consequently, charges proportional to the particle energy emanating from a detector can be held as a potential for a fixed time period, allowing energy evaluation by an externally connected analyzer. At the termination of this arbitrarily selected time period the time constant of the amplifier is returned to normal, that is, shortened. The energy dependent potential is thereby removed rapidly and the amplifier is ready to accommodate a succeeding event.

It is an object of the present invention to provide a pulse amplifier with output pulses having relative amplitudes corresponding accurately with the relative charges of input pulses.

It is an object of the present invention to provide an improved pulse amplifier having a stabilized base line voltage level, relative immunity from extraneous noise, and accurate pulse energy resolution.

It is another object of the present invention to provide a new means by which the time constant of resistance-capacitance networks in a pulse amplifier may be actively lengthened for a preselected time interval upon receipt of an input pulse.

BRIEF DESCRIPTION OF THE DRAWING

The invention will be better understood by reference to the following description together with the FIGURE, which is a circuit drawing of the invention with portions thereof shown in block form. Typical response curves occurring at various points in the circuit are indicated with voltage taken along the ordinate and time along the abscissa. The origins for the various curves are all taken at the same point in time and the time scales are equal.

DESCRIPTION OF THE PREFERRED EMBODIMENT

Referring now to the FIGURE, there is shown a preamplifier 11 of a preferred design for use in conjunction with an amplifier 12. The preamplifier 11 receives input signal 29 at input terminals 13 from a pulse source such as a radiation detector. The preamplifier 11 utilizes two operational type amplifier stages 14 and 16 connected in series. An input signal 29 from terminal 13 is applied to the input of operational amplifier stage 14. A charge storage or integrating capacitor 17 is connected from the output to the input stage 14 to integrate input pulses. A pair of series connected resistors 18 and 19 are connected in parallel with capacitor 17 and normally, that is, when no pulse is present at the input 13, will cause the time constant of the integrator stage 14 to be relatively short.

The operational amplifier stage 16 has a negative feedback resistor 21 which reduces the effective gain of the stage. Series connected resistors 22 and 23 are connected in parallel with feedback resistor 21, the total series resistance of resistors 22—23 being considerably lower than the resistance of feedback resistor 21. Thus the gain of stage 16 is reduced still further by the low resistance of series resistors 22—23. A resistor 24 is connected from the output of stage 16 to the juncture of series connected resistors 18—19. The collector of a PNP transistor 26 is connected to the juncture between resistors 22—23, the emitter being grounded. The base potential is applied from a control source to be described later.

It should be noted that the circuit associated with the various transistors shown in the FIGURE have been simplified by deletion of conventional biasing and power supply circuitry which, if included, would merely add confusing details without adding to an understanding of the invention.

The variable gain stage 16 has an operational amplifier with controllable gain. When the transistor 26 is conducting, the juncture between resistors 22 and 23 is coupled through the transistor to ground. Thus, negative feedback signals from the output of amplifier stage 16 cannot pass through resistors 22 and 23 to the input, but are shunted to ground. The gain is then controlled by the negative feedback through the relatively high resistance of resistor 21 and so the gain of stage 16 is high. On the other hand, if transistor 26 is not conductive, then additional negative feedback signals pass through resistors 22 and 23, and the gain of stage 16 will be relatively low. When the gain of stage 16 is low, little negative feedback is applied through resistor 24 and so integration stage 14 has a short time constant, since capacitor 17 is shunted by resistors 18 and 19. When the gain of stage 16 is high, the voltages through resistor 24 cancel feedback signals at the juncture of resistors 18 and 19. Under such condition no feedback signals pass through resistor 19, and the time constant of integrator stage 14 is then long.

The output of the integrator stage 14 is applied to a logic sequence generator 27 in which output control signals are generated at terminals 25 and 30 upon receipt of an input signal. Such generator 27 may utilize conventional Schmitt trigger circuitry to produce flattop output signals upon receipt of an input pulse. A typical curve of voltage change with time at the output of integrator stage 14 is indicated in curve 28, the initial portion 32 indicating integration of an input detector pulse 29 applied at input terminals 13. A flattop portion 33 of curve 28 results from the long time constants provided in the preamplifier 11 and amplifier 12.

Normally, with no control pulse from terminal 25 present, the transistor 26 is not conductive and the gain of the variable gain amplifier 16 is relatively low, causing the integrator to have a low or short time constant. Shortly after the start of an input pulse, the logic sequence generator is triggered and a positive square wave pulse 31 from terminal 25 is applied to the base of transistor 26, causing the transistor to be nonconductive and lengthening the time constant of integrator stage 14.

The output signals 28 from preamplifier 11 are passed through a delay line 34 to provide a short interval during which operation of logic sequence generator 27 may be initiated. Typically, delay line 34 might provide 100 nanoseconds of delay. The delay of signal 28 is indicated in waveform 36, such delayed signal then being progressively amplified in amplifier stages 37 and 38 and in an output amplifier stage 39. The input of amplifier stage 37 is connected to delay line 34 while the output is coupled through a series connected capacitor 41 and resistor 42 to the input of amplifier stage 38. A PNP transistor 43 has a collector connected through a collector resistor 44 to the juncture of capacitor 41 and resistor 42. The transistor 43 has an emitter connected to a steady state potential such as ground while the base is connected through a base resistor 46 to output terminal 25 of logic generator 27.

When a positive control pulse from terminal 25 is applied to the base of transistor 43, the resistivity of the PNP transistor is made very high and functions as a switch to isolate the juncture of capacitor 41 and resistor 42 from ground. The input impedance of the amplifier stages 37, 38 and 39 is quite low relative to the resistances involved in the associated resistance-capacitance circuits. The resistor is thus essentially in parallel with resistor 44 and transistor 43. The resultant parallel resistance forms, with capacitor 41, a differentiator which has a short time constant when the transistor is conductive, but has a long time constant when the transistor is cut off or nonconductive. Since the output signal 31 at output 25 of the logic sequence generator causes the transistor 43 to have high resistivity during and immediately after the application of a pulse at input terminals 13, the time constant of the differentiator circuit between amplifier stages 37 and 38 is high during and immediately after a pulse.

A similar differentiator is provided at the output of the amplifier stages 38, there being a coupling capacitor 47, transistor 48, and collector resistor 49. The pulse 31 is applied to the base of transistor 48 through resistor 51, while the emitter is grounded. Signals through capacitor 47 and resistor 49 are coupled through series connected resistors 52 and 53 to the input of output amplifier stage 39.

A sampling control transistor 54 has a collector connected to the juncture of resistors 52 and 53, an emitter connected to ground potential, and a base connected through a resistor 56 to output terminal 30 of the logic sequence generator 27. An output sample pulse 57 is provided at terminal 30, occurring coincidentally with the latter portion of pulse 31. A waveform of the signal 58 at the output of stage 38 is shown in which the times during which the control pulse 31 and sample pulse 57 occur are indicated with respect to the signal pulse.

The operation of the sample transistor 54 is similar to that of transistor 26, the juncture of resistors 52 and 53 normally being at ground potential through the low impedance of transistor 54. When the pulse 57 causes the transitor 54 to have high impedance, signals are then coupled to the input of output stage 39. The sample transistor 54 prevents an output potential from appearing at output terminal 59 until the complete charge of a pulse applied at input terminals 13 has been accumulated in the various resistance-capacitance networks. The operation of the sampling transistor 54 provides an unambiguous flattop signal 61 at output terminal 59, the output signal corresponding to the terminal portion of the output 58 from amplifier 38. Such an output signal 61 is much easier to measure and record than an output signal with a variable amplitude.

At the end of the sampling period, both pulses 31 and 57 terminate, causing all the transistors in the circuit to become conductive so that the charge accumulated on integrating capacitor 17 and capacitors 41 and 47 are rapidly dissipated as indicated in the terminal portions of waveforms 28, 36 and 58. The amplifier is then in condition for receipt of a succeeding pulse without introduction of baseline error. By contrast, in a conventional amplifier the long time constant of the amplifier necessary to accurately accumulate the total charge of an input pulse retains a portion of the value of the pulse after the pulse has been sampled. The potential at the output of the various amplifier stages decreases very slowly to the baseline level. If a succeeding pulse appears before the baseline potential is reached, the amplitude of the incoming pulse is added to the "tail" of the preceding pulse and an inaccurate output pulse value appears at the output terminal 59. In the present invention, by shortening the time constant after a pulse has been sampled, the "tail" of the pulse is greatly shortened, that is, the baseline potential is rapidly attained after each pulse so that the amplitude of a succeeding pulse may be accurately measured.

In practice, the time constants of the amplifier are made about one-hundredth the time constant during a pulse.

Many variations are possible within the spirit and scope of the invention. For instance, the arrangement of the switching circuits could be varied to change the value of capacitance in the coupling circuits instead of the resistance. Or, the resistance in the resistance-capacitance networks could be the source-drain impedance of a field-effect transistor. The control signals from the logic generator is then applied to the gate of the transistor to change the resistance value. Therefore, it is not intended to limit the invention except as defined in the following claims.

I claim:

1. A circuit for amplifying pulses from a source, the combination comprising:

a. a pulse amplifier for receiving pulses from said source and having at least one resistance-capacitance pulse coupling network therein, said resistance-capacitance network having a relatively short time constant;

b. a logic generator for receiving pulses from said source and producing an output control signal in response to each said pulse, said control signal having a length extending over the time each pulse is being received at said pulse amplifier;

c. for increasing the impedance value of at least one of the components of said resistance-capacitance network upon receipt of said control signal from said logic generator; and d. a preamplifier connected between said pulse amplifier and said source, an integrating resistance-capacitance network being provided in said preamplifier, second means being provided in said preamplifier for increasing the time constant of said integrating resistance-capacitance network upon receipt of said control signal from said logic generator.

2. A circuit as described in claim 1 wherein the resistance of said resistance-capacitance network is made up of at least two parallel resistance branches, a rapidly acting switch being connected in series with one of said parallel resistance branches, said switch being openable upon receipt of said control signal.

3. A circuit as described in claim 2 wherein said switch is a transistor having decreased conductivity upon receipt of said control signal at a control terminal thereof.

4. A circuit as described in claim 1 wherein an operational-type amplifier stage is provided in said preamplifier, said integrating resistance-capacitance network having a capacitance and resistance connected in parallel in a negative feedback circuit from the output to the input of said operational amplifier stage, said second means having a variable gain amplifier stage receiving input signals from said operational amplifier stage and having a gain control means providing increased gain upon receipt of an output signal from said logic generator, said variable gain amplifier stage having an output signal inverted with respect to input signals, at least a portion of output signals from said variable-gain amplifier stage being applied at an intermediate point along said resistance in said integrating resistance-capacitance network in phase opposition to output signals from said operational amplifier, whereby the time constant of said integrating resistance-capacitance network is increased when an output signal from said logic generator is applied to said variable-gain amplifier stage.

5. A circuit for amplifying pulses from a source, the combination comprising:

a. a pulse amplifier for receiving pulses from said source and having at least one resistance-capacitance pulse coupling network therein, said resistance-capacitance network having a relatively short time constant;

b. a logic generator for receiving pulses from said source and producing an output control signal in response to each said pulse, said control signal having a length extending over the time each pulse is being received at said pulse amplifier and for a period after termination of each said input pulse, said logic generator further having a sampling output signal, said sampling signal being coincident with said control signal for at least a terminal portion of said period;

c. a sample gate circuit provided at the output of said pulse amplifier, said sample gate circuit being characterized by conductivity controllable by said sampling signal, the conductivity of said gate circuit being high upon receipt of said sampling signal whereby output signals from said pulse amplifier are preferentially coupled through said sample gate circuit when said sampling signal is applied thereto; and d. first means for increasing the impedance value of at least one of the components of said resistance-capacitance network upon receipt of said control signal from said logic generator.

6. A circuit as described in claim 5 wherein said pulse amplifier has a steady-state reference potential connection therein, said sample gate circuit having an impedance through which output signals from said pulse amplifier are passed, said sample gate circuit having a switch connected from an intermediate point along said impedance to said steady-state reference potential connection, said switch being openable upon receipt of said sampling pulse.

7. A circuit as described in claim 2 further characterized in that a signal delay means is connected between said source and said pulse amplifier.